(12) United States Patent
Van Dingenen et al.

(10) Patent No.: US 11,312,341 B2
(45) Date of Patent: Apr. 26, 2022

(54) HYDRODYNAMIC RETARDER SYSTEM AND METHOD OF CONTROLLING A HYDRODYNAMIC RETARDER SYSTEM

(71) Applicant: DANA BELGIUM N.V., Bruges (BE)

(72) Inventors: Joachim Van Dingenen, Ghent (BE);
Jan A. Bedert, Oostduinkerke (BE);
Hein Nevejant, Houthulst (BE)

(73) Assignee: Dana Belgium N.V., Bruges (BE)

( * ) Notice: Subject to any disclaimer, the term of this patent is extended or adjusted under 35 U.S.C. 154(b) by 227 days.

(21) Appl. No.: 16/608,425

(22) PCT Filed: Apr. 25, 2018

(86) PCT No.: PCT/EP2018/060641
§ 371 (c)(1),
(2) Date: Oct. 25, 2019

(87) PCT Pub. No.: WO2018/197586
PCT Pub. Date: Nov. 1, 2018

(65) Prior Publication Data
US 2020/0055492 A1     Feb. 20, 2020

Related U.S. Application Data

(60) Provisional application No. 62/490,230, filed on Apr. 26, 2017.

(51) Int. Cl.
*B60T 1/087*     (2006.01)
*B60T 10/02*     (2006.01)
(Continued)

(52) U.S. Cl.
CPC ............... *B60T 1/087* (2013.01); *F01P 3/20* (2013.01); *B60T 10/02* (2013.01); *F16D 57/02* (2013.01)

(58) Field of Classification Search
CPC ........... B60T 1/087; B60T 10/02; F16D 57/02
(Continued)

(56) References Cited

U.S. PATENT DOCUMENTS 2,946,416 A     7/1960  Snoy
3,180,692 A     4/1965  Muller
(Continued)

FOREIGN PATENT DOCUMENTS

CN       106402209 A      2/2017
DE    102006054615 B3 *  12/2007  .............. B60T 10/02
(Continued)

OTHER PUBLICATIONS

European Patent Office, International Search Report with Written Opinion, issued in PCT/EP2018/060641, dated Aug. 17, 2018, 14 pages, European Patent Office, Rijswick, Netherlands.

*Primary Examiner* — Thomas J Williams
(74) *Attorney, Agent, or Firm* — McCoy Russell LLP

(57) ABSTRACT

A controllable hydrodynamic retarder system for a transmission including an electronic controller unit (ECU) for selecting and controlling brake torque by adjusting a retarder outlet pressure is described. The system can include an algorithm to calculate a retarder outlet pressure set point or tables or brake torque curves or profiles to allow the ECU to calculate or look up the functional relationships between the retarder RT outlet pressure, a vehicle or rotor speed, and a brake torque curve selected by the operator to provide the selected RT outlet pressure. The systems disclosed can also include a cooling system or utilize a vehicles engine cooling system. In one embodiment, the cooler can be shared between a transmission and the controllable retarder and can be adjusted to accommodate cooling requirements. The ECU can also make adjustments to the RT outlet pressure to (Continued)

address short term and long term RT overheating protection independent of the cooling system.

14 Claims, 4 Drawing Sheets

(51) Int. Cl.
 *F16D 57/02* (2006.01)
 *F01P 3/20* (2006.01)
(58) Field of Classification Search
 USPC .................................. 188/293, 294
 See application file for complete search history.

(56) References Cited

U.S. PATENT DOCUMENTS

| | | | |
|---|---|---|---|
| 3,297,114 A | 1/1967 | Erdman et al. | |
| 3,659,687 A | 5/1972 | Edmunds | |
| 3,774,734 A | 11/1973 | Forster et al. | |
| 3,858,459 A | 1/1975 | Fuehrer et al. | |
| 3,863,739 A | 2/1975 | Schaefer et al. | |
| 3,987,874 A | 10/1976 | Fuehrer et al. | |
| 4,175,647 A | 11/1979 | Hanke et al. | |
| 4,773,513 A | 9/1988 | Herrmann et al. | |
| 4,864,872 A | 9/1989 | Stahl | |
| 5,351,795 A | 10/1994 | Dadel et al. | |
| 5,357,444 A | 10/1994 | Ishiguro et al. | |
| 5,400,251 A | 3/1995 | Ishiguro et al. | |
| 5,771,997 A | 6/1998 | Friedrich et al. | |
| 6,065,817 A | 5/2000 | Menke et al. | |
| 8,240,777 B2 | 8/2012 | Heren et al. | |
| 9,377,066 B2 | 6/2016 | Guillotte et al. | |
| 10,071,716 B2 | 9/2018 | Schlosser et al. | |
| 2005/0269177 A1 | 12/2005 | Vogelsang | |
| 2006/0090971 A1 | 5/2006 | Vogelsang | |
| 2014/0131153 A1 | 5/2014 | Laukemann et al. | |
| 2014/0172260 A1 | 6/2014 | Scherer | |

FOREIGN PATENT DOCUMENTS

| | | | | |
|---|---|---|---|---|
| DE | 102006030792 A1 | | 1/2008 | |
| DE | 102008034974 A1 | * | 2/2010 | ............. F16D 33/16 |
| WO | WO-9733077 A1 | * | 9/1997 | ............. B60T 1/087 |
| WO | WO-2010115609 A1 | * | 10/2010 | ............. B60T 10/02 |
| WO | WO-2014098711 A1 | * | 6/2014 | ............. F16D 57/00 |
| WO | WO-2016209148 A1 | * | 12/2016 | ............. B60T 10/02 |

* cited by examiner

| n_RT (rpm) \ p (bar) | 100% | 90% | 80% | 70% | 60% | 50% | 40% | 30% | 20% | 10% | 0% |
|---|---|---|---|---|---|---|---|---|---|---|---|
| 1000 | 1.0 | 1.0 | 1.0 | 1.0 | 1.0 | 1.0 | 1.0 | 1.0 | 1.0 | 1.0 | 1.0 |
| 1100 | 1.0 | 1.0 | 1.0 | 1.0 | 1.0 | 1.0 | 1.0 | 1.0 | 1.0 | 1.0 | 1.0 |
| 1200 | 1.5 | 1.4 | 1.4 | 1.3 | 1.3 | 1.2 | 1.2 | 1.1 | 1.1 | 1.0 | 1.0 |
| 1300 | 2.5 | 2.4 | 2.2 | 2.1 | 1.9 | 1.8 | 1.6 | 1.5 | 1.3 | 1.2 | 1.0 |
| 1400 | 3.6 | 3.3 | 3.1 | 2.8 | 2.6 | 2.3 | 2.0 | 1.8 | 1.5 | 1.3 | 1.0 |
| 1500 | 4.7 | 4.3 | 3.9 | 3.6 | 3.2 | 2.8 | 2.5 | 2.1 | 1.7 | 1.4 | 1.0 |
| 1600 | 5.7 | 5.3 | 4.8 | 4.3 | 3.8 | 3.4 | 2.9 | 2.4 | 1.9 | 1.5 | 1.0 |
| 1700 | 6.8 | 6.2 | 5.6 | 5.1 | 4.5 | 3.9 | 3.3 | 2.7 | 2.2 | 1.6 | 1.0 |
| 1800 | 7.9 | 7.2 | 6.5 | 5.8 | 5.1 | 4.4 | 3.7 | 3.1 | 2.4 | 1.7 | 1.0 |
| 1900 | 8.9 | 8.1 | 7.3 | 6.6 | 5.8 | 5.0 | 4.2 | 3.4 | 2.6 | 1.8 | 1.0 |
| 2000 | 10.0 | 9.1 | 8.2 | 7.3 | 6.4 | 5.5 | 4.6 | 3.7 | 2.8 | 1.9 | 1.0 |
| 2100 | 10.0 | 10.0 | 9.1 | 8.0 | 7.0 | 5.9 | 5.0 | 4.0 | 3.0 | 2.0 | 1.0 |
| 2200 | 10.0 | 10.0 | 9.9 | 8.8 | 7.7 | 6.6 | 5.5 | 4.3 | 3.2 | 2.1 | 1.0 |
| 2300 | 10.0 | 10.0 | 10.0 | 9.5 | 8.3 | 7.1 | 5.9 | 4.7 | 3.4 | 2.2 | 1.0 |
| 2400 | 10.0 | 10.0 | 10.0 | 10.0 | 9.0 | 7.6 | 6.3 | 5.0 | 3.7 | 2.3 | 1.0 |

RT capacity in case of sump @ 100°C

Fig. 2

| p (bar) | 100% | 90% | 80% | 70% | 60% | 50% | 40% | 30% | 20% | 10% | 0% |
|---|---|---|---|---|---|---|---|---|---|---|---|
| 1000 | 1.0 | 1.0 | 1.0 | 1.0 | 1.0 | 1.0 | 1.0 | 1.0 | 1.0 | 1.0 | 1.0 |
| 1100 | 1.0 | 1.0 | 1.0 | 1.0 | 1.0 | 1.0 | 1.0 | 1.0 | 1.0 | 1.0 | 1.0 |
| 1200 | 1.5 | 1.4 | 1.4 | 1.3 | 1.3 | 1.2 | 1.2 | 1.1 | 1.1 | 1.0 | 1.0 |
| 1300 | 2.5 | 2.4 | 2.2 | 2.1 | 1.9 | 1.8 | 1.6 | 1.5 | 1.3 | 1.2 | 1.0 |
| 1400 | 3.6 | 3.3 | 3.1 | 2.8 | 2.6 | 2.3 | 2.0 | 1.8 | 1.5 | 1.3 | 1.0 |
| 1500 | 4.7 | 4.3 | 3.9 | 3.6 | 3.2 | 2.8 | 2.5 | 2.1 | 1.7 | 1.4 | 1.0 |
| 1600 | 5.7 | 5.3 | 4.8 | 4.3 | 3.8 | 3.4 | 2.9 | 2.4 | 1.9 | 1.5 | 1.0 |
| 1700 | 6.8 | 6.2 | 5.6 | 5.1 | 4.5 | 3.9 | 3.3 | 2.7 | 2.2 | 1.6 | 1.0 |
| 1800 | 7.9 | 7.2 | 6.5 | 5.8 | 5.1 | 4.4 | 3.7 | 3.1 | 2.4 | 1.7 | 1.0 |
| 1900 | x 7.7 | 7.7 | 7.3 | 6.6 | 5.8 | 5.0 | 4.2 | 3.4 | 2.6 | 1.8 | 1.0 |
| 2000 | x 7.7 | 7.5 | 7.5 | 7.3 | 6.4 | 5.5 | 4.6 | 3.7 | 2.8 | 1.9 | 1.0 |
| 2100 | x 7.2 | x 7.2 | x 7.2 | 7.2 | 7.0 | 5.9 | 5.0 | 4.0 | 3.0 | 2.0 | 1.0 |
| 2200 | x 6.9 | x 6.9 | x 6.9 | x 6.9 | x 6.9 | 6.6 | 5.5 | 4.3 | 3.2 | 2.1 | 1.0 |
| 2300 | x 6.7 | x 6.7 | x 6.7 | x 6.7 | x 6.7 | x 6.7 | 5.9 | 4.7 | 3.4 | 2.2 | 1.0 |
| 2400 | x 6.2 | x 6.2 | x 6.2 | x 6.2 | x 6.2 | x 6.2 | x 6.2 | 5.0 | 3.7 | 2.3 | 1.0 |

RT capacity @ steady state temperatures — $n\_RT$ (rpm)

Fig. 3

HYDRODYNAMIC RETARDER SYSTEM AND METHOD OF CONTROLLING A HYDRODYNAMIC RETARDER SYSTEM

The present disclosure primarily relates to vehicle braking assistance referred to as retarder systems and methods. In particular, the systems and methods relate to hydrodynamic retarders and more particularly to integrated hydrodynamic transmission and retarder systems. More specifically, the systems and methods disclosed herein are directed to integrated hydrodynamic transmission and proportionally controllable retarder systems.

In hydrodynamic transmissions, in particular in hydrodynamic transmissions for automotive vehicles, a retarder can be connected to the transmission system, directly or indirectly to the transmission input or output shaft or any other transmission shaft to assist braking, for example of an automotive vehicle the transmission is incorporated in, by slowing the rotation of the transmission shaft. The retarder uses the friction and shock losses of the movable blades or vanes of a rotor connected to the transmission shaft and the fixed blades or vanes of a stator connected to a retarder frame. A chamber containing the blades can be fluid-filled or emptied. The toroidal fluid flow in the chamber acts against the blades of the rotor, slowing the rotation of the rotor and of the transmission shaft and generating vehicle braking. This slowing of the transmission shaft is especially helpful when the brakes are under heavy use during downhill driving. The movable blades can be attached to the transmission shaft or to a separate rotor that is connected to the transmission shaft directly or through a gear or gear box to slow the driveshaft further and assist the braking of the vehicle. Retarder systems can use standard transmission fluid (gear oil), engine oil, or a separate fluid, fluid mixtures, or oil.

When vehicle braking assistance or retardation is needed, fluid, typically the transmission fluid or oil is pumped into the retarder chamber, and the friction and shock losses of the blades or vanes connected to or part of the transmission shaft will slow the vehicle. ON/OFF retarders can either be filled or emptied. For proportionally controllable retarders, the degree of retardation can be varied in several ways including adjusting the fill level of the retarder chamber, the retarder inlet pressure, the retarder outlet pressure in the chamber, or an extension of the gap between the rotor and the stator.

The friction and shock losses heat the fluid. Overheated fluid will degrade rapidly, reducing viscosity and performance and requiring a higher change interval frequency and reducing the life of the seals. To prevent overheating, the fluid can be circulated through a cooling system. The cooling system can be integrated in the engine cooling system of the vehicle, or a separate cooling system specific to the transmission and/or the retarder may be used. For instance, the cooling system may comprise an air-oil heat exchanger. After passing the cooling system, the cooled fluid may be returned to the oil or fluid sump before being re-circulated. Indeed, cooling of the transmission fluid may be needed even where a retarder is not utilized due to high demands placed on the transmission system such as in off-highway vehicles. In some integrated hydrodynamic transmission and retarder systems, especially in proportionally controlled hydrodynamic retarders, cooling of the working or transmission fluid is performed by a cooling system integrated in the engine cooling system of the vehicle, the cooling system containing an oil-engine coolant heat exchanger to dissipate the heat from the fluid or oil into the motor cooling circuit of the vehicle.

Proportionally controlled hydrodynamic retarders are retarders that can provide a selectable, predetermined and/or variable brake torque or slowing force. Such proportionally controlled retarder systems can also have cooling systems that are independent or separate from the engine cooling system or that are integrated in the engine cooling. In certain known proportionally controlled retarders, a heat exchanger is used to dissipate the heat from the fluid into the motor cooling circuit of the vehicle. In order to save space and/or minimize costs, these known systems typically do not make use of a pump to circulate oil between the retarder and the cooler. Instead such systems typically use the retarder itself as a turbo pump to provide the pressure head to create flow through the retarder and the cooler. During activation of the retarder, a valve allows fluid to enter the retarder chamber while the air may be released, for example through a breather. The cooling flow rate is determined by the balance between the retarder pressure head and the head loss in the tubing or channels, valves and the heat exchanger. As a result, these components have narrow tolerances and cannot be easily changed without affecting the flow rate and consequently the cooling function. Indeed, in many cases, the limited ability to change components and thereby flow rates can be the reason for integrating a heat exchanger into the retarder system.

In other known proportionally controlled hydrodynamic retarder systems, a relatively small pump can be used to provide the retarder filling flow. In case faster filling is required, an accumulator system can be added. Known proportionally controlled hydrodynamic retarders can typically be controlled in several ways.

U.S. Pat. No. 3,987,874, which is incorporated herein in its entirety, discloses controlling the retarder inlet pressure to control the brake torque applied to the rotor, wherein a high inlet pressure typically results in a higher brake torque applied to the transmission.

U.S. Pat. No. 3,774,734, which is incorporated herein in its entirety, discloses control of retarder outlet pressure, wherein a higher outlet pressure typically results in a higher brake torque.

U.S. Pat. No. 5,771,997, which is incorporated herein in its entirety, discloses controlling the fill level in the retarder to control the brake torque, wherein a higher filling level typically results in a higher brake torque.

U.S. Pat. No. 4,864,872, which is incorporated herein in its entirety, discloses controlling an extension of a gap between the rotor and the stator, wherein reducing the extension of the gap typically results in a higher brake torque.

And U.S. Pat. No. 3,863,739, which is incorporated herein in its entirety, discloses brake torque relative to retarder properties and rotor speed. At a given retarder inlet pressure, the brake torque applied by the retarder increases with increasing rotor speed.

Hence, there is demand for a hydrodynamic retarder system including a hydrodynamic retarder that can be more flexibly integrated with different cooling systems and that preferably provides improved control of the brake torque applied via the hydrodynamic retarder, and for a corresponding method of operating said system.

A hydrodynamic retarder system and method of operation capable of providing these functionalities are defined in the independent claims. Special embodiments are described in the dependent claims.

Thus, a hydrodynamic retarder system is presently proposed, in particular a hydrodynamic retarder system for a transmission of an automotive vehicle. The proposed hydrodynamic retarder system includes:

- a hydrodynamic retarder (RT) comprising a rotor and a stator and having an inlet and an outlet;
- a retarder (RT) proportional valve in fluid communication with the retarder (RT) outlet, the RT proportional valve configured to control a RT outlet pressure; and
- an electronic control unit (ECU);
- wherein the ECU is configured to determine a retarder (RT) outlet pressure set point based on at least one of or both of a current rotor speed and a desired brake torque; and
- wherein the ECU is configured to control the RT proportional valve based on the RT outlet pressure set point such that the RT proportional valve provides a RT outlet pressure within a range or within a predetermined range of the RT outlet pressure set point.

Furthermore, a method of controlling the hydrodynamic RT system is presently proposed, the method comprising the steps of:

- determining a RT outlet pressure set point based on at least one of or both of a current speed of a rotor of the hydrodynamic RT and a desired brake torque; and
- controlling the RT proportional valve based on the RT outlet pressure set point such that the RT proportional valve provides a RT outlet pressure within a range of the RT outlet pressure set point.

The presently proposed system and method can address issues of interchangeability of the cooling system, the variability of braking torque curves applied by the RT, overheating and other issues not previously considered. In particular, hydrodynamic transmissions including the presently proposed hydrodynamic RT system can potentially provide a selectable braking torque function and keep a high freedom in transmission cooling system choice.

The ECU may be configured or programmed to determine the RT outlet pressure set point based on the current rotor speed and based on the desired brake torque.

The hydrodynamic RT system may further comprise a table stored in the ECU. For example, the ECU may include a memory device for storing the table. The memory device may include an electronically readable device, a magnetically readable device or an optically readable device, for example. The table may comprise one or more rotor speed values. Additionally or alternatively, the table may comprise one or more desired brake torque values. The table may provide the RT outlet pressure set point as a function of at least one of or both of the one or more rotor speed values, and the one or more desired brake torque values.

In other words, the table may include brake torque curves showing the relationship between vehicle or rotor/transmission shaft speed, the retarder outlet pressure and the brake torque applied by the retarder. This relationship can be formulated into an algorithm, a brake torque table, curve or profile. These can be formulated for specific configurations of the vehicle depending on factors such as retarder size and blades or vane shapes, vehicle weight, overall driveline drag, typical descent values and other parameters. The algorithms, tables or brake torque curves or profiles which can indicate the degree of brake torque relative to rotor speed and/or vehicle speed and retarder outlet pressure can be used by electronic controls in the vehicle to provide a proportionally controllable retarder.

The operator or driver of the vehicle the hydrodynamic RT system may be incorporated in usually cannot accurately judge or determine the degree of brake torque that will be applied by the RT based on the RT outlet pressure and/or based on the speed of the vehicle. Specifically, the brake torque applied by the RT typically increases with increasing rotor speed thereby following a characteristic curve, wherein each point on this curve may require or represent a certain minimal outlet pressure which may also increase with increasing rotor speed. As such, for a certain RT outlet pressure the brake torque usually follows a characteristic curve for increasing rotor speeds up to the rotor speed for which the requested minimal outlet pressure equals the applied outlet pressure, and from this point on the brake torque applied by the RT normally remains about constant for further increasing rotor speeds. As disclosed herein, the ability to shift between a series of prescribed or stored braking torque curves, wherein each curve may include a brake torque which strictly increases with increasing rotor speed, can improve the drivability of the vehicle and improve safety as compared to control strategies which include directly controlling the RT outlet pressure without taking into account other variables such as rotor speed. In addition, a combination of high RT outlet pressure and a high RT capacity/high brake torque setting can result in rapid overheating of the retarder fluid. The table stored in the ECU may include brake torque curves which are designed to avoid such combinations.

The ECU may be configured or programmed to control or regulate the RT outlet pressure via the RT proportional valve using feedback control, for example.

The hydrodynamic RT system may further comprise an input device, in particular an input device in communication with the ECU. The input device may comprise but is not limited to at least one of or each of a pedal, a lever, a knob, a switch, a joystick, a touch screen, a microphone or a camera, for example. The ECU may be configured or programmed to determine the desired brake torque based on or further based on an input signal provided by an operator via the input device. For example, the operator may select a certain brake torque setting such as a desired brake torque value which may include a desired percentage of a maximum applicable brake torque or a desired brake torque curve.

The hydrodynamic RT system may further comprise one or more vehicle sensors in communication with the ECU. The ECU may then be configured to determine the outlet pressure set point based on or further based on one or more vehicle sensor signals provided by the one or more vehicle sensors.

The one or more vehicle sensors may include but are not limited to at least one of or each of a temperature sensor for measuring an RT fluid temperature, for example for measuring an RT fluid temperature at the RT outlet, within an RT chamber, within a cooler, within one or more transmission cooling channels, or within a fluid sump; a pressure sensor for measuring an RT fluid pressure, in particular for measuring an RT fluid pressure at the RT outlet; an inclination sensor for measuring an inclination angle, in particular an inclination angle of the RT, of the transmission the hydrodynamic RT system may be coupled to, or of the vehicle the hydrodynamic RT system may be incorporated in; and a speed sensor, in particular for measuring a speed of the RT rotor, a speed of a transmission shaft, or a speed of the vehicle the hydrodynamic RT system may be incorporated in.

The hydrodynamic RT system may comprise at least one of or each of a fluid sump, a cooler and at least one cooler flow valve. The at least one cooler flow valve may be configured to selectively fluidly connect the RT proportional valve with either one of the cooler and the fluid sump. For example, the at least one cooler flow valve may have a first control position and a second control position. The at least one cooler flow valve may be configured such that when it is switched to the first control position it directs fluid from the RT proportional valve to the fluid sump, for example in such a way that the fluid from the RT proportional valve bypasses the cooler. And the at least one cooler flow valve may be configured such that when it is switched to the second control position it directs fluid from the RT proportional valve to the cooler. After passing the cooler, the fluid may then be directed from the cooler to the sump, for example.

The at least one cooler flow valve may be biased to the first control position, for example by a biasing member which may include an elastic biasing member such as a spring. For instance, the at least one cooler flow valve may be configured such that if the RT outlet pressure is above a first pressure threshold, the at least one cooler flow valve is switched to the second control position fluidly connecting the RT proportional valve with the cooler. And the at least one cooler flow valve may be configured such that if the RT outlet pressure is below a second pressure threshold equal to or smaller than the first pressure threshold, the at least one cooler flow valve fluidly is switched to the first control position connecting the RT proportional valve with the fluid sump.

For example, the at least one cooler flow valve may comprises at least one hydraulic actuator in fluid communication with the RT outlet. The hydraulic actuator may then be configured to control a control position of the at least one cooler flow valve based on the RT outlet pressure. For instance, the hydraulic actuator of the cooler flow valve may apply a RT outlet pressure to a valve spool of the cooler flow valve and may bias the cooler flow valve toward the second control position of the cooler flow valve. For example, the outlet pressure applied to the cooler flow valve via the hydraulic actuator of the cooler flow valve may act against the above-described biasing member of the cooler flow valve biasing the cooler flow valve toward the first control position. Additionally or alternatively, the at least one cooler flow valve may comprise a solenoid in communication with the ECU wherein the solenoid is configured to control a control position of the at least one cooler flow valve based on electromagnetic signals received from the ECU. For example, the ECU may be in communication with a pressure sensor for measuring a RT outlet pressure and may control a control position of the cooler flow valve via the solenoid of the cooler flow valve based on a RT outlet pressure measured or sensed using the pressure sensor.

The hydrodynamic RT system may further comprise a torque converter and/or one or more transmission lubrication channels. The torque converter may be in fluid communication with the fluid sump, for example via a transmission pump. And the one or more transmission lubrication channels may be in fluid communication with the fluid sump. The at least one cooler flow valve may be configured to selectively fluidly connect the torque converter with either one of the cooler and the one or more transmission lubrication channels. For example, the at least one cooler flow valve may be configured such that when it is switched to the first control position it directs fluid from the torque converter to the cooler. From the cooler the fluid may then further be directed to the one or more transmission lubrication channels. And from the one or more transmission lubrication channels the fluid may then further be directed to the fluid sump. And the at least one cooler flow valve may be configured such that when it is switched to the second control position it directs fluid from the torque converter to the one or more transmission lubrication channels, for example such that the fluid from the torque converter bypasses the cooler.

The at least one cooler flow valve may be configured such that if the RT outlet pressure is above the first pressure threshold, the at least one cooler flow valve fluidly connects the torque converter with the one or more fluid lubrication channels such that fluid from the torque converter bypasses the cooler. And the at least one cooler flow valve may be configured such that if the RT outlet pressure is below the second pressure threshold equal to or smaller than the first pressure threshold, the at least one cooler flow valve fluidly connects the torque converter with the cooler.

The RT proportional valve may comprise a first hydraulic actuator. The first hydraulic actuator of the RT proportional valve may bias the RT proportional valve toward a closed position in which the RT proportional valve increases a RT outlet pressure. The first hydraulic actuator of the RT proportional valve may be fluidly connected with a first pilot valve. The first pilot valve may selectively fluidly connect the first hydraulic actuator of the RT proportional valve with the fluid sump, for example via one of a RT pump or the above-mentioned transmission pump. That is, a control position of the first pilot valve may control or regulate a hydraulic force applied to a valve spool of the RT proportional valve via the first hydraulic actuator of the RT proportional valve. The first pilot valve may include a solenoid in communication with the ECU and configured to control a control position of the first pilot valve based on electromagnetic signals received from the ECU. For example, the ECU may be in communication with a pressure sensor for measuring a RT outlet pressure and may be configured to control a control position of the first pilot valve based on the measured RT outlet pressure.

The RT proportional valve may further comprise a second hydraulic actuator. The second hydraulic actuator of the RT proportional valve may bias the RT proportional valve toward an open position in which the RT proportional valve reduces a RT outlet pressure. The second hydraulic actuator of the RT proportional valve may be fluidly connected or selectively fluidly connected with the RT outlet. That is, the RT proportional valve may be configured such that the RT outlet pressure biases the RT proportional valve toward the open position in which the RT proportional valve reduces the RT outlet pressure.

Additionally or alternatively, the RT proportional valve may be electrically controlled. For example, the RT proportional valve may comprise a solenoid in communication with the ECU and configured to control a control position of the RT proportional valve based on electromagnetic signals received from the ECU. For example, the ECU may be in communication with a pressure sensor for measuring a RT outlet pressure and may be configured to control a control position of the RT proportional valve based on the measured RT outlet pressure.

The RT proportional valve may further comprise a biasing member, in particular an elastic biasing member such as a spring. The biasing member of the RT proportional valve may be configured to bias the RT proportional valve toward the open position.

The hydrodynamic RT system may further comprise a fluid sump, a RT pump in fluid communication with the fluid sump, and a RT on/off valve configured to selectively fluidly connect the RT pump with the RT inlet for selectively filling the hydrodynamic RT.

The RT on/off valve may comprise a first hydraulic actuator. The first hydraulic actuator of the RT on/off valve may bias the RT on/off valve toward an open position in which the RT on/off valve fluidly connects the RT inlet with the RT pump so that the RT pump may fill the hydrodynamic RT. The first hydraulic actuator of the RT on/off valve may be selectively fluidly connected with a fluid pump such as with the above-described transmission pump via a second pilot valve. The second pilot valve may include a solenoid in communication with the ECU and configured to control a control position of the second pilot valve based on electromagnetic signals received from the ECU. For example, the ECU may be configured or programmed to fluidly connect the first hydraulic actuator of the RT on/off valve with the fluid pump to switch the RT on/off valve to the open position and to fill the hydrodynamic RT based on an input command provided by an operator, or based sensor signals provided by one or more vehicle sensors.

The RT on/off valve may further comprise a second hydraulic actuator. The second hydraulic actuator of the RT on/off valve may bias the RT on/off valve toward a closed position in which the RT on/off valve fluidly isolates the RT inlet from the RT pump so that the RT pump may not fill the hydrodynamic RT. The second hydraulic actuator of the RT on/off valve may be fluidly connected or selectively fluidly connected with the RT inlet.

Additionally or alternatively, the RT on/off valve may be electrically controlled. For example, the RT on/off valve may comprise a solenoid in communication with the ECU and configured to control a control position of the RT on/off valve based on an electromagnetic signal received from the ECU. For example, the ECU may be configured or programmed to control a control position of the RT on/off valve based on an input command provided by an operator, or based sensor signals provided by one or more vehicle sensors.

The RT on/off valve may further comprise a biasing member, in particular an elastic biasing member such as a spring. The biasing member of the RT on/off valve may be configured to bias the RT on/off valve toward the closed position in which the RT on/off valve fluidly isolates the RT inlet from the RT pump so that the RT pump may not fill the hydrodynamic RT.

The ECU may be configured or programmed to control a brake torque by adjusting the RT outlet pressure. For example, the ECU may be configured or programmed to use an algorithm to calculate or tables or brake torque curves or profiles to look up the functional relationships between retarder RT outlet pressure, vehicle or rotor speed, and brake torque curve selected by the operator to provide the selected RT outlet pressure within certain limits. The ECU may also be configured to make adjustments to the RT outlet pressure to address short term and long term RT overheating protection independent of whether or not fluid from the RT is directed to a cooling system.

The ECU may be configured or programmed such that an operator can select a brake torque curve which gives a particular degree or capacity of brake torque such as between 0% or other minimum setting such as 25% and 100% or other maximum such as 90%. The minimum setting may be represented by a minimum brake torque curve and the maximum setting may be represented by a maximum brake torque curve, a variation of the brake capacity may provide a linear or other interpolation between those curves. The ECU may then be configured to select the appropriate RT outlet pressure for the current rotor speed to reach a selected brake torque curve using an algorithm, table or other brake curve/capacity profile. For example, the ECU may be configured or programmed to include a processor connected to an electric memory storing an algorithm, table or brake curve or profile to calculate or obtain an RT outlet pressure set point according to the brake torque curve selected by the operator and vehicle or rotor speed. As such, the ECU may be configured or programmed to communicate an RT outlet pressure set point obtained directly or indirectly to the RT proportional valve that can adjust the RT outlet pressure required to provide the selected brake torque.

In addition, unexpected high brake torque and rapid overheating can be greatly reduced or prevented because the controllable or proportional RT system disclosed herein can be configured to be set, controlled and/or adjusted accordingly. In other words, the ECU may be configured or programmed to adjust or disallow the selecting of a brake torque curve that could result in extremely high brake torque under certain vehicle operating conditions such as high rotor speeds and high RT outlet pressure. For instance, the ECU may be configured or programmed to avoid selecting an RT outlet pressure set point that could lead to rapid overheating of the hydrodynamic RT system. In other words, at high rotor speeds and high RT outlet pressure, the ECU may be configured to adjust the RT outlet pressure to prevent a high brake torque selected by the operator from causing extremely high brake torque and rapid overheating. For example, a high brake torque setting selected by the operator would normally result in the ECU calculating or obtaining a high RT outlet pressure set point under low to moderate rotor speed and/or RT outlet pressure conditions because overheating under such conditions would not occur. But under high rotor speed and/or RT outlet pressure the ECU can be programmed to adjust or disallow an RT outlet pressure set point that could lead to rapid overheating. For example, RT outlet pressure set points that could result in rapid overheating can be programmed in the algorithm or identified in the brake torque table, curve or profile.

It is understood however that after long term use of the RT even using an appropriate brake curve or brake torque setting could possibly still result in overheating of the RT fluid beyond the cooler capacity, which can in time also lead to RT overheating referred to as long-term overheating. The presently proposed hydraulic RT system may be configured to address such long-term heating by further applying an overheating correction factor to the RT outlet pressure set point. For example, the ECU can be connected to one or more temperature sensors measuring the temperature of the fluid or can account for time of active operation of the retarder to estimate long-term overheating, and can adjust the RT outlet pressure set point.

The hydraulic RT system may comprise a temperature sensor in/at the retarder outlet fluid flow, and the ECU may be configured or programmed to apply a correction factor to the RT outlet pressure set point based on the measured temperature, for example using an algorithm, a brake torque table or a brake torque curve. The correction factor can be stored in a lookup table or calculated by the processor using a correction factor formula to adjust the RT outlet pressure set point. The ECU may be configured or programmed to communicate with the RT proportional valve regulating the RT outlet pressure. Additionally or alternatively, the ECU may be configured or programmed to lower the outlet pressure set point based on temperature values measured with other temperature sensors, such a sump or a torque converter outlet temperature sensor.

These and further advantages of the presently disclosed system and method are described in the following detailed description and are depicted in the accompanying drawing in which:

FIG. 2 shows a table of retarder outlet pressure set points in bars given retarder braking capacity in percentage terms (horizontal axis) at given rotor speeds (vertical axis);

FIG. 3 shows a table of retarder outlet pressure set points in bars affected by correction factors preventing long-term overheating for a certain cooling system given retarder braking capacity in percentage terms (horizontal axis) at given rotor speeds (vertical axis)

It is to be understood that the invention may assume various alternative components, orientations and configurations, except where expressly specified to the contrary. It is also understood that the specific devices and processes illustrated in the attached drawings, and described in the specification are merely exemplary embodiments of the inventive concepts disclosed and defined herein. Therefore, specific dimensions, directions or other physical characteristics relating to the various embodiments disclosed herein are not to be considered as limiting, unless expressly stated otherwise.

Figure 1:
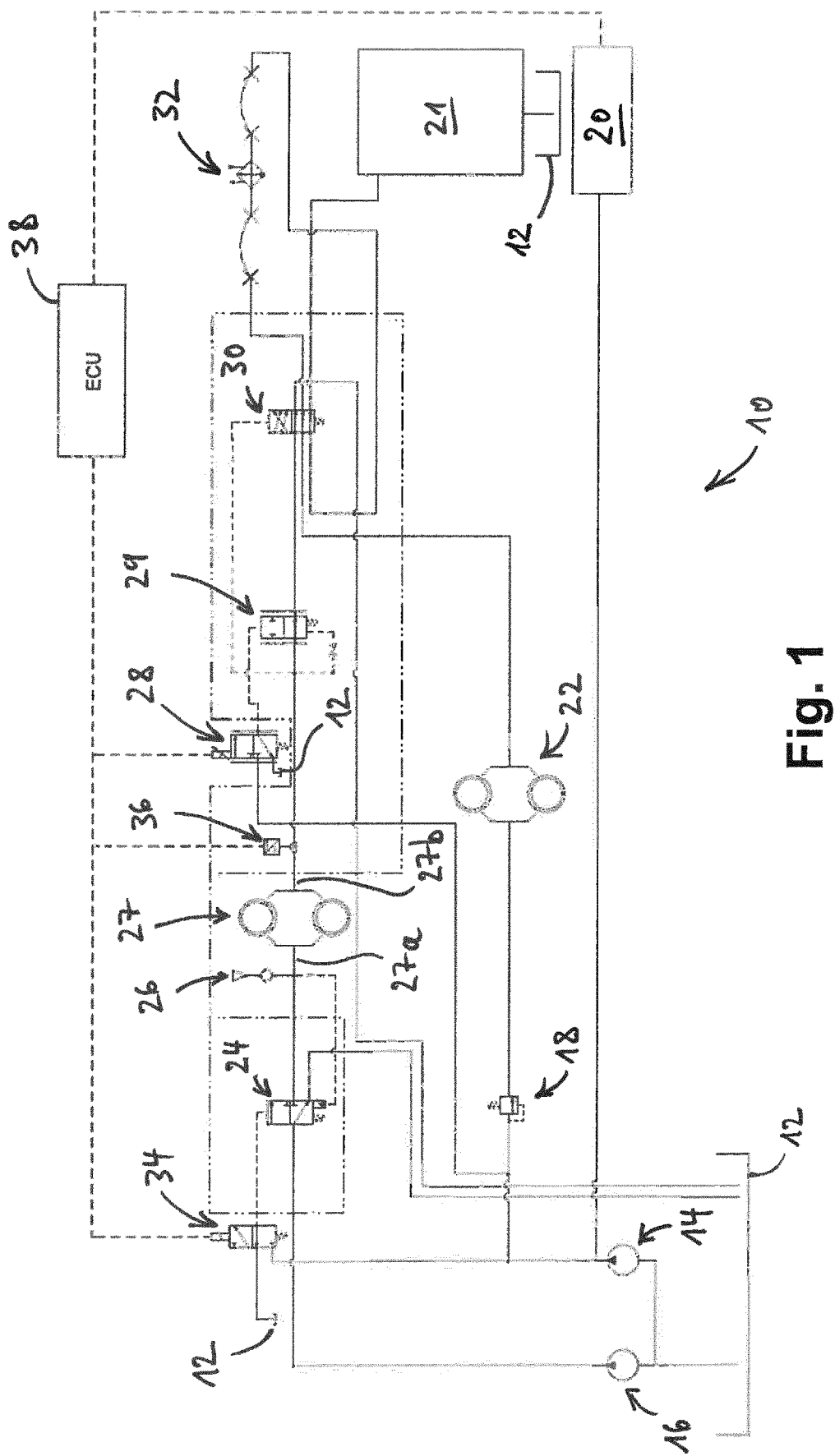
FIG. 1 shows a schematic view of one embodiment of a cooler independent hydrodynamic transmission and retarder system.

One embodiment of a hydrodynamic transmission having a controllable or proportional retarder system 10 is shown in FIG. 1. In this embodiment, system 10 can have two pumps, RT Pump 16 for supplying fluid flow to the retarder circuit and a transmission (TM) pump 14 for supplying fluid flow to the transmission. In another embodiment system 10 can have a single fluid pump for supplying fluid to the parallel fluid circuits. In such a system, the single pump can be a larger capacity pump to provide flow and can be a two flow pump allowing the same or different flow rates. For example, the pumps 14 and 16 can be volumetric type pumps and can have the same or similar nominal flow rate. System 10 can use a variety of fluids to supply lubrication and torque converter and retarder functionality such as transmission fluid, hydraulic fluid or other acceptable fluid or oil.

The transmission circuit can include the TM pump 14 that provides fluid flow to the main regulating valve 18 at an appropriate fluid flow pressure to operate the clutches and the retarder (RT) 27 via the RT pilot valves 34 and 28. For example, the transmission circuit fluid may flow from the sump 12 to main the regulating valve 18 to the torque convertor 22, to a cooler flow valve 30, to the transmission lubrication channels 21 and to the sump 12.

The retarder circuit can include RT pump 16, RT on/off valve 24, breather check valve 26, RT 27, RT proportional valve 29, the cooler flow valve 30 and the sump 12.

In the embodiment shown in FIG. 1, the cooler flow valve 30 can receive fluid flow from both the retarder circuit and the transmission circuit and may direct flow to the cooler 32 depending on the cooling needs of the system 10. When the RT 27 is not in use or when the RT outlet pressure indicates low pressure and thereby low heat levels, the cooler flow valve 30 may direct flow from the torque convertor 22 in the transmission circuit to the cooler 32 and then to the transmission lubrication channels 21 and back to the sump 12, as shown in FIG. 1.

The two RT pilot pressure valves 34 and 28 can be part of the transmission valve control 20. One of the two RT pilot pressure valves 34, 28, namely RT pilot on/off valve 34, can control the state or the position of the RT on/off valve 24 to activate or deactivate the RT 27, and the other pilot pressure valve, namely RT pilot proportional valve 28, can control the state or position of the RT proportional valve 29 to regulate pressure on the RT out connection. In alternative embodiments, the control of the valves 24 and 29 can be accomplished directly by solenoids controlled by the ECU, without the use of pilot pressure valves 34 and 28.

When the vehicle is powered off, the RT on/off valve 24 can be in the off position by the action of a spring force. RT on/off valve 24 remains in the off position until a solenoid or other force urges the RT on/off valve 24 to the on position against the spring force. The spring force may return RT on/off valve 24 to the off position once the vehicle is powered off. Alternatively, the RT on/off valve 24 may be returned to the off position manually the operator or automatically by an automated system. In the off position, RT on/off valve 24 directs fluid flow from RT pump 16 directly into the sump 12. A part of the flow may be directed through a mist valve, for example. In the embodiment of the system 10 depicted in FIG. 1 the backing pressure is low to minimize the drag loss although sufficient backing pressure may be applied for feeding a mist valve. From this state, with RT pump 16 providing fluid flow from sump 12 through RT on/off valve 24 and back to the sump, switching the RT on/off valve 24 to the on position either through manual or automated system, fluid flow is directed to retarder 27 through a RT inlet 27a, and filling the retarder cavity. The fluid in the retarder cavity causes a toroidal oil flow, acting against movable blades or vanes which are part of or connected to a transmission shaft causing braking action or brake torque. A breather check valve 26 may be provided to prevent any leakage of the filling flow. The RT on/off valve 24 may be configured to be controlled by moving a valve spool of the RT on/off valve 24 through action of the RT pilot on/off valve 34.

Deactivating RT 27 by moving the RT on/off valve 24 to the off position after operation of RT 27 can potentially cause the RT 27 to empty due to the rotor centrifugal force. The rotation of the bladed or vaned rotor in the retarder chamber may act as a turbo pump pumping the remaining fluid in the retarder cavity and/or in the RT circuit between the RT on/off valve 24 and the RT 27 to the sump 12. A breather 26 in the inlet line can be used to fill the RT 27 with air during emptying. The RT proportional valve 29 and the cooler flow valve 30 can be in a position connecting the RT outlet 27b with the sump 12 without any throttling for quick emptying. A retarder mist valve may be provided to provide oil mist to cool down and slow down the air stream in the retarder cavity to reduce the air drag of an empty retarder.

The degree of brake torque applied to transmission shaft can be set to follow a certain brake torque curve also referred to as retarder capacity. The brake torque curve can be controlled by the operator as opposed to a non-controllable retarder or to an on/off retarder in which the degree of brake torque provided by the retarder follows a fixed brake curve depending on vehicle and/or driveshaft speed, among other possible less important factors. The degree of brake torque can be set by the operator adjusting a setting of an electronic control unit (ECU) 38. The ECU 38 is preferably in communication with a vehicle CAN BUS and/or man machine interface and/or multi media interface. The degree of brake torque or braking torque set by the vehicle operator can potentially also be overridden by a back-up automated system configured to prevent overheating or to correct or avoid unsafe situations.

In order to activate functioning of RT 27 to provide brake torque, ECU can move RT pilot on/off valve 34 from the off position against the spring biasing force to the on position to cause fluid flow through the RT 27 to produce brake torque against the rotor or transmission shaft. The RT pilot on/off valve 34 can be switched on manually by the operator of the vehicle by a lever or a pedal or other means or using automated systems such as one sensing vehicle braking parameters, such as engagement of brakes, brake friction, overheating of the brakes and/or one sensing vehicle inclination and declines the vehicle encounters and/or one sensing the vehicle or engine speed or speed increase.

The degree of brake torque, meaning the wanted or desired brake profile/curve or retarder capacity, can be set by an operator via the same lever or pedal or other means. Additionally or alternatively, the degree of brake torque can be selected using a separate selector device. Upon activation of the RT 27 the ECU 38 may sense the lever or pedal position or selector to obtain the desired degree of brake torque and may obtain the vehicle speed or rotor speed from the vehicle sensors. The ECU 38 can then determine an RT outlet pressure set point that provides the desired degree of brake torque. For example, the ECU 38 may include a processor and an algorithm stored on electronic storage or memory to calculate the RT outlet set point. Additionally or alternatively, the processor can look up the RT outlet pressure set point from brake curve profiles, tables or graphs stored in an electric memory or storage.

Examples of brake torque tables that illustrate the relationship between rotor speed (n-RT in RPM), brake torque (RT capacity in 10% increments) and RT outlet pressure (pressure values in table measured in bars) are shown in FIG. 2. An example of the effect of a possible long-term overheating protection on the outlet pressure set point is shown in FIG. 3. In FIG. 3 those RT outlet pressure set point values which are reduced with respect to the corresponding RT outlet pressure set point values shown in FIG. 2 in order to prevent long-term overheating are marked with a letter "x". For example, in the table depicted in FIG. 2 the value of the RT outlet pressure set point associated with a rotor speed of 2200 rpm and with a brake torque capacity of 90% is 10.0 bar. By contrast, in the table depicted in FIG. 3 the corresponding value of the RT outlet pressure set point associated with a rotor speed of 2200 rpm and with a brake torque capacity of 90% is reduced to 6.9 bar.

Once ECU 38 has determined the RT outlet pressure set point, the ECU 38 can send the appropriate electrical current to the RT pilot proportional valve 28 which moves the respective solenoid that applies or releases fluid pressure to RT proportional valve 29. The RT proportional valve 29 position is changed based on this fluid pressure, applying the requested RT outlet pressure.

Once ECU 38 senses the retarder activation signal and calculated or obtained the brake torque setting and vehicle or rotor speed, the ECU 38 can send that appropriate electrical current to the RT pilot on/off valve 34 which moves the respective solenoid that applies fluid pressure to the RT on/off valve 24. As such the RT on/off valve 24 is pushed in lower position. This directs fluid flow to the RT inlet 27a, filling the retarder cavity and initiating the retarder braking action. Breather check valve 26 prevents any leakage of the filling flow. In alternative embodiments, the ECU 38 may be configured or programmed to send electrical control signals directly to the RT on/off valve 24 equipped with a solenoid to move the valve position to and from an on and off position. It is understood that in the latter embodiment the RT on/off valve 24 comprises an electromagnetically activated valve instead rather than a fluid pressure controlled valve.

The RT pilot proportional valve 28 adjusts the RT proportional valve 29 which is fluidly connected to the retarder outlet 27b. RT proportional valve 29 can adjust the throttling of the fluid exiting the retarder outlet to ensure the retarder outlet pressure stays within certain range of the pressure set point. In alternative embodiments the ECU 38 may be configured or programmed to control the RT proportional valve 29 by sending electrical signals directly to the RT proportional valve 29 equipped with a solenoid. For example, a pressure sensor 36 may be provided to communicate the RT outlet pressure to the RT pilot proportional valve 28 or to the ECU 38. It is understood that in the latter embodiment the RT proportional valve 29 comprises an electrically controlled valve rather than a fluid pressure controlled valve.

The RT proportional valve 29 may be configured such that fluid from the RT proportional valve 29 can be directed selectively either to the sump 12 or to the cooler 32 via the cooler flow valve 30, for example depending on the RT outlet pressure. For example, the cooler flow valve 30 may be biased to a valve position directing flow to the sump 12, for instance by means of a spring, until the bias force is overcome to move a valve spool of the cooler flow valve 30 to direct flow to the cooler 32 and only subsequently to the sump 12. In the embodiment of the system 10 depicted in FIG. 1 when the RT outlet pressure exceeds a pressure from about 1.5 bar to about 5.5 bar, preferably from about 2 bar to about 3 bar, a valve spool of the RT proportional valve 29 is moved to direct flow to the cooler 32 and only subsequently to the sump 12. In this position, the cooler flow valve 30 directs the fluid flow from the transmission circuit directly to the transmission lubrication channels 21 and to the sump 12 without passing the cooler 12. It is conceivable that the predetermined pressure determining the position of the cooler flow valve 30 can be adjusted by changing the spring, which could be required in case of very high cooler pressure loss.

The pressure at the RT outlet 27b may determine the position of the cooler flow valve 30. For example, the cooler flow valve 30 may include a hydraulic actuator in fluid communication or in selective fluid communication with the RT outlet 27b. In another embodiment, the cooler flow valve 30 position is directly controlled by a solenoid, receiving electrical current from the ECU 38. ECU 38 sends an electrical current based on the RT outlet pressure set point or based on a sensor measuring the RT outlet pressure or based on other means.

Flow from RT proportional valve 29 can flow to cooler flow valve 30 which can receive flow from both the retarder and transmission circuits. As described above, when the RT 27 is not in use or in use without a sufficiently high RT outlet pressure, the flow to the cooler flow valve 30 coming from the transmission circuit, in particular from the torque converter 22, may be directed to the cooler 32 whereas the retarder circuit flow may be directed to bypass the cooler 32. While it may be preferable to direct the retarder circuit flow to the cooler 32 as soon as the RT 27 is activated, the RT outlet pressure typically may not be sufficiently high to overcome the cooler pressure loss. Consequently, when the RT 27 is in use and when the RT outlet pressure is sufficiently high, the cooler flow valve 30 directs the flow from the retarder circuit to the cooler 32, and the transmission circuit flow is directed to bypass the cooler 32.

The cooler flow valve 30 can be controlled by pressure sensors in or about the valve or the cooler flow valve 30 can be controlled by the ECU 38 and pressure sensors provided in the retarder circuit and communicating with the ECU 38. It is conceivable that the predetermined pressure determining flow to the cooler valve 30 can be adjusted by changing the spring of the cooler flow valve 30, which could be required in case of very high cooler pressure loss.

Switching the cooler from the TM circuit to the RT circuit is possible without large pressure gradients in case the flow rate in both the TM circuit and the RT circuit are similar or about the same. Consequently, the cooler 32 can be positioned in the circuit containing the largest heat source, as soon as the RT outlet pressure passes a certain cooler flow valve pressure threshold. Therefore, the hydrodynamic retarder system presently disclosed can accept cooler and tubing components with relatively high head losses, up to the cooler flow valve pressure threshold. These components can be switched without affecting the retarder control function. In the system 10 depicted in FIG. 1 for example, the cooler 32 and the fluid tubing can be selected according to desired preferences as long as the head loss is below the pressure threshold of the cooler flow valve 30. This pressure threshold may be determined by the spring of the cooler flow valve 30, for example. Even the threshold pressure could be increased as desired by changing the cooler flow valve spring, which could be required in case of very high cooler and tubing head losses. Nevertheless, this could lead to some discontinuities/steps in the brake torque curves and/or increased sump fluid temperature under some working conditions.

The presently disclosed system may be configured to control overheating in the system regardless of the cooler functionality. In particular, controllable retarder system for transmissions as disclosed herein can provide short-term and long-term overheating protection that is cooler independent. Short term rapid overheating can occur when the RT 27 is engaged during high vehicle or rotor speed paired with high brake torque capacity and/or an already high RT outlet pressure. Such rapid overheating can lead to destruction of seals or other components.

Short-term RT overheating can be prevented or substantially reduced by the ECU 38 and brake torque algorithm, table, curves or profiles by rejecting any calculated or obtained RT outlet pressure set points that could cause rapid overheating. For example, when an operator selects a high brake torque setting and the retarder 27 is activated while the vehicle or rotor is travelling or rotating at a high speed, the algorithm will calculate or the table will indicate using a high RT outlet pressure set point. But since this RT outlet pressure set point may result in rapid overheating, the ECU can be programmed to either apply a correction factor to lower the pressure set point or may disallow use of the set point if it exceeds certain values based on the conditions.

Long-term RT overheating, which can occur when the retarder has been used for an extended period of time and heat generation is higher than the cooler capacity, can be avoided or substantially reduced by the present systems. In one embodiment, a correction factor on the RT outlet pressure set point that may otherwise be determined by ECU 38 based on the RT outlet temperature can be applied. Shaded areas on table shown in FIG. 3 illustrate reduced RT outlet pressures set points to prevent long-term overheating conditions.

Figure 4:
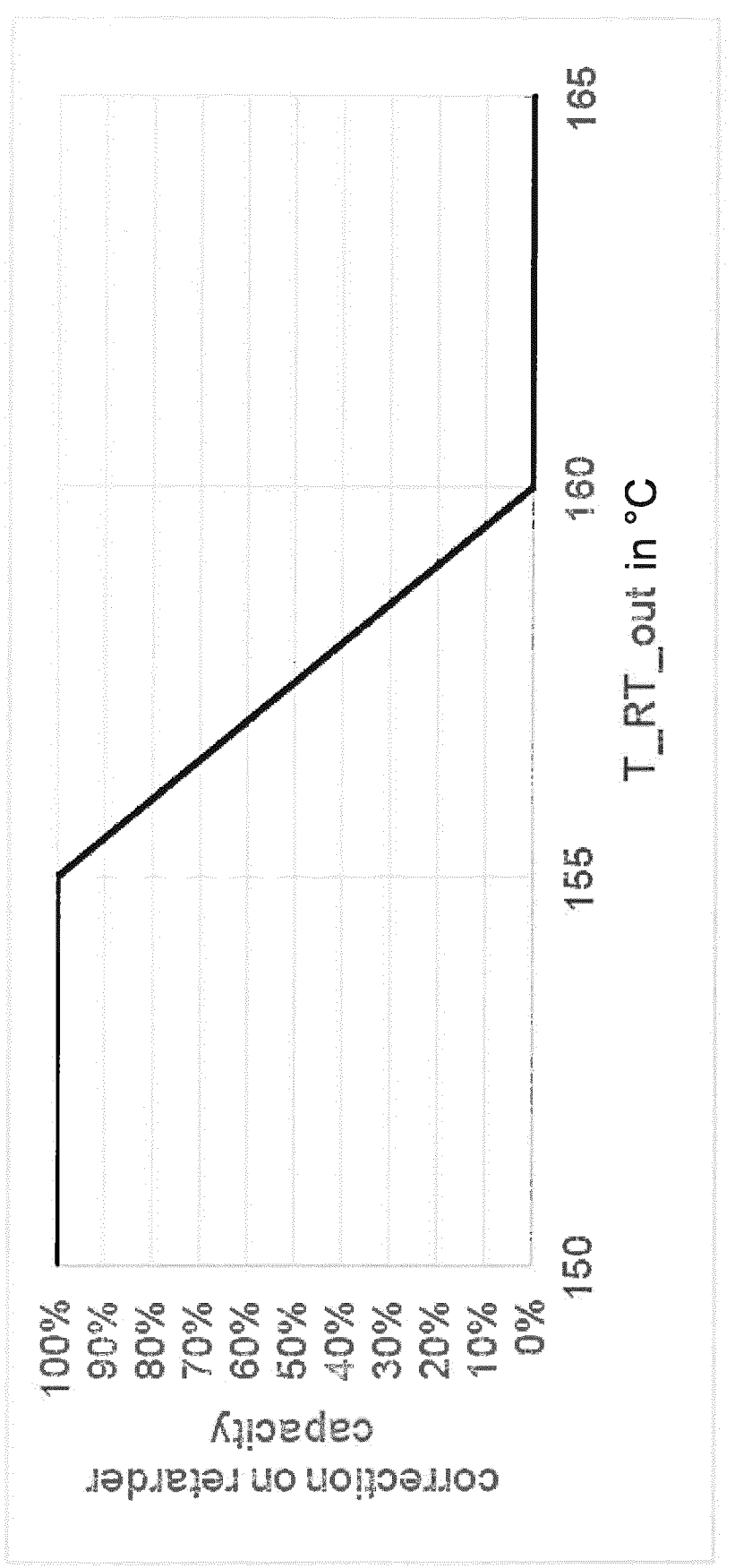
FIG. 4 shows a graph of retarder capacity correction factor based on measurement of the temperature RT outlet.

Temperature sensors also connected to ECU can cause ECU to apply a correction factor to reduce the outlet pressure set point from the outlet pressure set point determined by the algorithm, tables or curves to prevent long-term overheat from long-term retarder use. In one embodiment, temperature sensor 36 can be included in the fluid flow exiting retarder fluid outlet or adjacent thereto to protect against overheating of the fluid. In one embodiment, the ECU 38 receives temperature data to adjust the retarder via control of RT outlet pressure according to FIG. 4, which illustrates the degree or percentage reduction of the RT outlet pressure set point.

As one example, the retarder outlet pressure can be multiplied by a correction factor from 1 to 0, in case the temperature at the retarder outlet changes from 160° C. to 165° C. Temperatures below 160° C. the correction factor can be 1 which means that there is no outlet pressure correction. As such, the retarder outlet temperature remains under 165 C at least in steady state condition.

While this invention has been described with reference to illustrative embodiments, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications would be recognized by those skilled in the art as an equivalent to one or more elements recited in the following claims, and shall be covered by such claims to the fullest extent permitted by law.

Among other things, the present disclosure may relate or additionally relate to one or more of the following aspects:

1. A controllable hydrodynamic retarder for a transmission comprising:
   (a) a fluid sump for holding a volume of fluid;
   (b) a retarder on/off valve selectively movable from an off position restricting fluid flow from sump to a retarder to an on position on activation of retarder to direct fluid from the sump to the retarder; retarder drawing fluid from sump via turbo pump action;
   (c) the retarder having an outlet for fluid flow to exit retarder and flow to a retarder proportional valve;
   (d) the retarder proportional valve in fluid communication with the retarder outlet for regulating a retarder outlet pressure according to a retarder outlet pressure set point and for directing fluid flow towards a cooler; and
   (e) an electronic controller unit operably connected to the retarder on/off valve, the retarder proportional valve and connected a vehicle bus for obtaining vehicle properties of rotor speed and brake torque setting, the electronic controller configured to calculate or obtain the retarder outlet pressure set point upon activation of retarder, move retarder on/off valve to the on position and control retarder proportional valve position to provide a retarder outlet pressure within a range of the retarder outlet pressure set point.

2. The controllable hydrodynamic retarder for a transmission of aspect 1, further comprising a pump in fluid communication with the sump for pumping fluid from the sump to the retarder on/off valve wherein the retarder on/off valve movable from the off position directing fluid flow from pump to sump to the on position directing fluid flow to the retarder by the electronic controller unit.

3. The controllable hydrodynamic retarder for a transmission of aspect 2, further comprising a cooler flow valve in fluid communication between the retarder proportional valve and the cooler for directing fluid flow from retarder proportional valve to the cooler or the sump.

4. The controllable hydrodynamic retarder for a transmission of aspect 3, further comprising: a transmission pump in fluid communication with the sump for pumping fluid through a transmission circuit including a transmission lubrication channel and exiting to the cooler flow valve, wherein cooler flow valve is configured to direct fluid flow from the transmission circuit to the cooler and the fluid flow from the retarder proportional valve directed to the sump and bypassing the cooler, unless the retarder outlet pressure exceeds a predetermine pressure at which point cooler flow valve directs fluid flow from the retarder proportional valve to the cooler and directs the fluid flow from the transmission circuit fluid flow to the sump and bypasses the cooler.

5. The controllable hydrodynamic retarder for a transmission of aspect 4, wherein the cooler flow valve is spring biased in a first position directing fluid flow from the retarder proportional valve to the sump and directing flow from the transmission circuit to the cooler, wherein fluid flow from the retarder proportional valve exceeds a preset fluid pressure moves cooler flow valve to second position directing fluid flow from the retarder proportional valve to the cooler and then sump.

6. The controllable hydrodynamic retarder for a transmission of aspect 4, wherein the cooler flow valve is controlled by a solenoid receiving electrical current directly from the ECU.

7. The controllable hydrodynamic retarder for a transmission of aspect 4, wherein the cooler flow valve position is controlled by pilot pressure coming from a pilot pressure valve controlled by the ECU, the ECU determining the cooler valve position based the retarder outlet pressure set point or based on a pressure sensor signal.

The invention claimed is:

1. A hydrodynamic retarder system, in particular for a transmission of an automotive vehicle, comprising:
   a hydrodynamic retarder comprising a rotor and a stator and having an inlet and an outlet;
   a retarder proportional valve in fluid communication with the retarder outlet, the retarder proportional valve configured to control a retarder outlet pressure;
   an electronic control unit (ECU);
   a fluid sump;
   a cooler; and
   at least one cooler flow valve selectively fluidly connecting the retarder proportional valve with either one of the cooler and the fluid sump;
   wherein the ECU is configured to determine a retarder outlet pressure set point based on at least one of or both of a current rotor speed and a desired brake torque; and
   wherein the ECU is configured to control the retarder proportional valve based on the retarder outlet pressure set point such that the retarder proportional valve provides the retarder outlet pressure within a range of the retarder outlet pressure set point.

2. The hydrodynamic retarder system of claim 1, wherein the ECU is configured to determine the retarder outlet pressure set point based on the current rotor speed and based on the desired brake torque.

3. The hydrodynamic retarder system of claim 1, further comprising a table stored in the ECU, the table comprising one or more rotor speed values and one or more desired brake torque values, and the table providing the retarder outlet pressure set point as a function of the one or more rotor speed values and the one or more desired brake torque values.

4. The hydrodynamic retarder system of claim 1, further comprising an input device, wherein the ECU is configured to determine the desired brake torque based on on an input signal provided by an operator via the input device.

5. The hydrodynamic retarder system of claim 1, further comprising one or more vehicle sensors, wherein the ECU is configured to determine the outlet pressure set point further based on one or more vehicle sensor signals provided by the one or more vehicle sensors.

6. The hydrodynamic retarder system of claim 5, wherein the one or more vehicle sensors include at least one of or each of a temperature sensor for measuring a retarder fluid temperature, at the retarder outlet, a pressure sensor for measuring a retarder fluid pressure, at the retarder outlet, an inclination sensor for measuring an inclination angle, and a vehicle speed sensor for measuring a vehicle speed.

7. The hydrodynamic retarder system of claim 1, wherein the at least one cooler flow valve is configured such that if the retarder outlet pressure is above a first pressure threshold, the at least one cooler flow valve fluidly connects the retarder proportional valve with the cooler; and wherein the at least one cooler flow valve is configured such that if the retarder outlet pressure is below a second pressure threshold equal to or smaller than the first pressure threshold, the at least one cooler flow valve fluidly connects the retarder proportional valve with the fluid sump such that fluid from the retarder proportional valve bypasses the cooler.

8. The hydrodynamic retarder system of claim 7, further comprising:
   a torque converter and one or more transmission lubrication channels in fluid communication with the fluid sump;
   wherein the at least one cooler flow valve selectively fluidly connects the torque converter with either one of the cooler and the one or more transmission lubrication channels.

9. The hydrodynamic retarder system of claim 8, wherein the at least one cooler flow valve is configured such that if the retarder outlet pressure is above the first pressure threshold, the at least one cooler flow valve fluidly connects the torque converter with the one or more transmission lubrication channels such that fluid from the torque converter bypasses the cooler; and wherein the at least one cooler flow valve is configured such that if the retarder outlet pressure is below the second pressure threshold equal to or smaller than the first pressure threshold, the at least one cooler flow valve fluidly connects the torque converter with the cooler.

10. The hydrodynamic retarder system of claim 9, wherein the at least one cooler flow valve comprises at least one hydraulic actuator in fluid communication with the retarder outlet and configured to control a control position of the at least one cooler flow valve based on the retarder outlet pressure; and/or wherein the at least one cooler flow valve comprises a solenoid in communication with the ECU and configured to control a control position of the at least one cooler flow valve based on electromagnetic signals received from the ECU.

11. The hydrodynamic retarder system of claim 10, wherein the retarder proportional valve comprises a hydraulic actuator fluidly connected with a first pilot valve, the first pilot valve including a solenoid in communication with the ECU and configured to control a control position of the first pilot valve based on electromagnetic signals received from the ECU; and/or wherein the retarder proportional valve comprises a solenoid in communication with the ECU and configured to control a control position of the retarder proportional valve based on electromagnetic signals received from the ECU.

12. The hydrodynamic retarder system of claim 1, further comprising:

a retarder pump in fluid communication with the fluid sump; and a retarder on/off valve configured to selectively fluidly connect the retarder pump with the retarder inlet.

13. The hydrodynamic retarder system of claim 12, wherein the retarder on/off valve comprises a hydraulic actuator selectively fluidly connected with a further fluid pump via a second pilot valve, the second pilot valve including a solenoid in communication with the ECU and configured to control a control position of the second pilot valve based on electromagnetic signals received from the ECU; and/or wherein the retarder on/off valve comprises a solenoid in communication with the ECU and configured to control a control position of the retarder on/off valve based on an electromagnetic signal received from the ECU.

14. A method of controlling a hydrodynamic retarder system, in particular for a transmission of an automotive vehicle, the hydrodynamic retarder system comprising:

a hydrodynamic retarder comprising a rotor and a stator and having an inlet and an outlet;

a retarder proportional valve in fluid communication with the retarder outlet, the retarder proportional valve configured to control a retarder outlet pressure;

an electronic control unit (ECU);

a fluid sump;

a cooler; and at least one cooler flow valve selectively fluidly connecting the retarder proportional valve with either one of the cooler and the fluid sump;

the method comprising the steps of:

determining a retarder outlet pressure set point based on at least one of or both of a current rotor speed and a desired brake torque; and controlling the retarder proportional valve based on the retarder outlet pressure set point such that the retarder proportional valve provides a retarder outlet pressure within a range of the retarder outlet pressure set point.

* * * * *